United States Patent [19]

Chang

[11] 4,266,127

[45] May 5, 1981

[54] MASS SPECTROMETER FOR CHEMICAL IONIZATION AND ELECTRON IMPACT IONIZATION OPERATION

[76] Inventor: Cherng Chang, 3065 Maginn Dr., Xenia, Ohio 45385

[21] Appl. No.: 965,255

[22] Filed: Dec. 1, 1978

[51] Int. Cl.[2] ........................ B01D 59/44; H01J 49/00

[52] U.S. Cl. .................................... 250/288; 250/281; 250/423 R

[58] Field of Search ............... 250/281, 282, 288, 289, 250/423 R, 457; 73/23.1

[56] References Cited

U.S. PATENT DOCUMENTS

| | | | |
|---|---|---|---|
| 3,536,910 | 10/1970 | Ormrod et al. | 250/288 |
| 3,733,907 | 5/1973 | Briggs | 250/288 |
| 4,005,291 | 9/1973 | Arsenault | 250/282 |
| 4,018,241 | 4/1977 | Sodal et al. | 250/288 |
| 4,105,916 | 8/1978 | Siegel | 250/423 R |

FOREIGN PATENT DOCUMENTS

| | | | |
|---|---|---|---|
| 431576 | 12/1972 | U.S.S.R. | 250/423 |

OTHER PUBLICATIONS

"Alternate Scan CI/EI Mass Spectrometry", Taylor et al., *Pittsburgh Conference on Anal. Chem. & Applied Spect.* Mar. 1979.

"A 15-CM Radius Mass Spectrometer which Simultaneously Collects Positive and Negative Ions", Svec et al., *International J of Mass Spectrometry and Ion Physics I,* 1968, pp. 41-52.

"A New Chemical Ionization Mass Spectrometer", Chait et al., *Adv. Mass Spect.,* vol. 6, 471, 1974, pp. 471-476.

"Gas Chromatograph-Mass Spectrometer with Dual Electron Impact/High Pressure Ion Sources", Ryhage, *Anal. Chem.,* vol. 48, No. 12, Oct. 1770, pp. 1829-1831.

"G. C.-C.I.-M.S.-Source Design", Kruger et al., 21st Annual Conference on Mass Spectrometry, 1973, pp. 381-384.

*Primary Examiner*—Bruce C. Anderson

*Attorney, Agent, or Firm*—Jacox & Meckstroth

[57] ABSTRACT

A mass spectrometer instrument for chemical analysis. An instrument of this invention is capable of performing cyclic operation repetitively and automatically. Each operation cycle consists of at least one chemical ionization operation mode and one venting operation mode. Furthermore, an instrument of this invention is capable of performing cyclic operation which includes multiple chemical ionization operation modes in which each of a plurality of reagent gases is individually employed for each chemical ionization operation mode. Electron impact ionization can also be conducted during each venting operation mode should it be desired.

Positive ion and negative ion spectra are also recorded simultaneously which further improves the efficiency of the cyclic operation.

51 Claims, 9 Drawing Figures

MASS SPECTROMETER FOR CHEMICAL IONIZATION AND ELECTRON IMPACT IONIZATION OPERATION

BACKGROUND OF THE INVENTION

For a chemical ionization mass spectrometer which is interfaced with a gas chromatograph the peak resolution achieved by the gas chromatograph is often deteriorated to some degree because of an unavoidable sample build-up which results from insufficient source conductance. It is therefore highly desirable that after each chemical ionization operation the source conductance can be momentarily increased in order to prevent this sample build-up. Known chemical ionization mass spectrometers are not capable of performing this source venting operation in a repeatable and automatic manner.

It is very desirable and usually necessary for chemical analysis that sample material be treated in a plurality of chemical ionization modes by sequentially introducing each of a plurality of reagent gases into the ion source. Multiple chemical ionization modes are of value only if rapid and efficient venting of the chemical ionization source can be achieved after each chemical ionization operation mode. Known mass spectrometers are not capable of rapid switching from a first chemical ionization operation mode to a second chemical ionization mode in a cyclic repeatable and automatic manner.

For a mass spectrometer which is interfaced with a gas chromatograph it is also highly desirable that sample material which enters the ionization region from the gas chromatograph column be treated in both a chemical ionization mode and in an electron impact ionization mode within a period less than the residence time of the sample material within the ion source region. Numerous spectrometers have been designed and built which are capable of operation in both a chemical ionization mode and in an electron impact ionization mode within the same ionization region. However, each of these known mass spectrometers requires manual switching between a chemical ionization mode and an electron impact ionization mode. It is difficult, if not impossible, for known spectrometers to treat in both a chemical ionization mode and in an electron impact ionization mode each of a plurality of sample materials sequentially entering the ionization region from the gas chromatograph.

In most conventional quadrupole mass spectrometers, due to their inherent design, only ions of one polarity can be extracted and detected at any instant of time, in spite of the fact that both positive ions and negative ions are usually formed simultaneously under typical ionization conditions. Although some quadrupole mass spectrometers have been constructed allowing sequential detection of positive ions and negative ions by manually switching the voltage polarities of the ion source and the detector, this operation is achieved only with considerable waste of labor and sample materials.

In one recent design of quadrupole mass spectrometer it has been possible to extract positive ions and negative ions from the ion source region alternatively at high frequence by pulsing the voltage polarities of the ion source and lens electrodes. Although this type of operation achieves some improvements over the previous designs in mass spectrometers, the fact still remains that only ions of one polarity can be extracted at a time during which the ions of opposite polarity are lost without being ultilized.

For mass spectrometers employing magnetic sectors instead of quadrupole analyzers as their resolution devices, one design has been reported capable of extracting and analyzing both positive ions and negative ions simultaneously. This was achieved by employing two independent magnetic sectors, detectors and mass scanning circuits. However, due to the fact that two completely independent mass scanning circuits must be utilized, the obtained positive ion and negative ion mass spectra have no relationship to each other. This fact makes it very difficult to obtain accurate mass calibration for ions in one spectrum based on the spectrum containing ions of opposite polarities and known masses.

U.S. Pat. Nos. 2,999,157, 3,307,033, 3,405,263, 3,555,272, 3,573,453, 3,849,656, 4,005,291, and 4,066,894 disclose structure related to mass spectrometers. However, the structure shown in each of these patents has one or more of the limitations or disadvantages discussed above.

It is therefore an object of this invention to provide a mass spectrometer which may be interfaced with a gas chromatograph and in which the source conductance can be momentarily increased after each chemical ionization operation, to prevent sample build-up.

Thus, it is a further object of this invention to provide such a mass spectrometer which is capable of venting operations in a repeatable and automatic manner.

It is another object of this invention to provide a mass spectrometer which is capable of treatment of sample material in a plurality of chemical ionization modes by sequentially introducing each of a plurality of reagent gases into the ion source region.

Another object of this invention is to provide means by which any one of a plurality of operational cycles can be achieved.

Another object of this invention is to provide means for achieving rapid and efficient source venting by either manual or automatic operation.

It is another object of this invention to provide a quadrupole mass spectrometer which is capable of detecting both positive ions and negative ions truly simultaneously and also capable of facilitating the ion mass calibration for any one mass spectrum based on the information provided by the other spectrum.

Other objects and advantages of this invention reside in the construction of parts, the combination thereof, the method of manufacture, and the mode of operation, as will become more apparent from the following description.

SUMMARY OF THE INVENTION

A mass spectrometer of this invention includes means for operation thereof in an automatic repeating cycle. Each operation cycle may include at least one chemical ionization operation mode and one venting operation mode which are executed sequentially and automatically. Prior to each chemical ionization operation mode, elements of the mass spectrometer are readjusted automatically so that optimum operation can be achieved. During each venting operation mode the flow of reagent gas into the ionization source is closed off, while the source conductance is increased to allow rapid venting of the ion source region. The spectrum obtained corresponds only to the sample introduced during the existing chemical ionization operation mode, without interference caused by the sample introduced during the previous operation cycle.

The automatic operation cycle of this invention may also include a plurality of chemical ionization modes, with each chemical ionization mode followed with a venting operation mode. The obtained spectrum for each chemical ionization mode therefore occurs only as a result of the presence of the reagent gas introduced during the existing chemical ionization mode, without interference caused by the reagent gas introduced during the previous chemical ionization mode.

The automatic operation cycle of this invention may also include an electron impact ionization operation mode, in addition to one or more chemical ionization modes. This electron impact ionization operation mode may occur during the venting operation mode, with the elements of the mass spectrometer automatically adjusted to fulfill the requirements of optimum ion source venting and electron impact ionization.

This invention is also capable of allowing both positive ions and negative ions resulting from chemical ionization to be detected during each automatic operation cycle. In order to reduce the duration of each operation cycle it is preferred that both positive ions and negative ions be detected simultaneously.

The automatic operation cycle of this invention includes a chemical ionization mode in which the ionization region is primarily enclosed by an ion source enclosure. In one embodiment of this invention, during a venting operation mode at least a portion of the ion source enclosure is moved away from the ionization region. Efficient venting of the content of the ion source region can therefore be achieved.

This invention also comprises a quadrupole mass spectrometer which is capable of simultaneously extracting both positive ions and negative ions from an ionization region for analysis. The required D.C. and R.F. energies of the positive ion quadrupole analyzer and the negative ion quadrupole analyzer are derived from the same electrical circuit. This results in considerable cost saving, but most importantly it greatly facilitates the accurate mass calibration for one spectrum based on the information of the known peak positions recorded regarding the other spectrum.

DESCRIPTION OF THE PREFERRED EMBODIMENTS

Figures 1, 2, 3, 4:
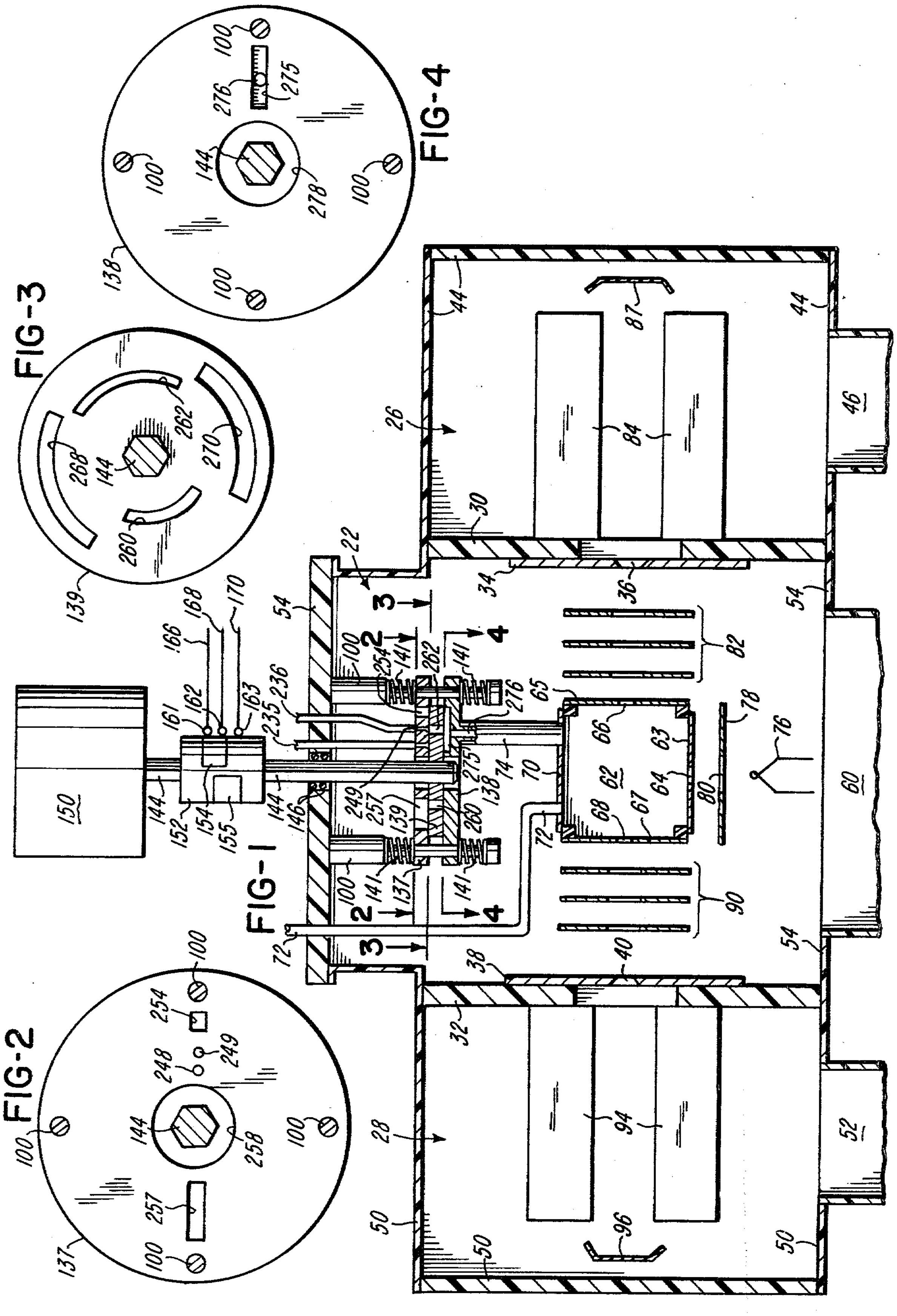
FIG. 1 is a diagrammatic view, with portions in section, of a mass spectrometer of this invention.
FIG. 2 is an enlarged sectional view taken substantially on line 2—2 of FIG. 1.
FIG. 3 is an enlarged sectional view taken substantially on line 3—3 of FIG. 1.
FIG. 4 is an enlarged sectional view taken substantially on line 4—4 of FIG. 1.

A mass spectrometer of this invention as illustrated in FIG. 1 comprises primarily three principal sections, an ion source section 22, a positive ion analyzer section 26, and a negative ion analyzer section 28. A separation wall 30 separates the positive ion analyzer section 26 from the ion source section 22. A separation wall 32 separates the negative ion analyzer section 28 from the ion source section 22. The separation wall 30 carries an entrance plate 34 which has an opening 36 therethrough. The separation wall 32 carries an entrance plate 38 which has an opening 40 therethrough.

The positive ion analyzer section 26 has enclosing walls 44, provided with a pumping port 46. The negative ion analyzer section 28 has enclosing walls 50, provided with a pumping port 52. The ion source section 22 is enclosed by the separation walls 30 and 32 and by wall members 54, and is provided with a pumping port 60.

Within the ion source section 22 is an ion source box 62. Preferably, each of the walls of the ion source box 62 are of metal material. A lower wall 63 of the ion source box 62 is provided with an electron entrance opening 64. The ion source box 62 has a positive ion exit wall 65, provided with a positive ion exit opening 66, and a negative ion exit wall 67 which is provided with a negative ion exit opening 68. The walls 65 and 67 are insulated from each of the other walls.

The ion source box 62 also has an upper wall 70 to which is joined a sample inlet conduit 72 and a reagent gas inlet conduit 74, which is, preferably, of flexible material. The sample inlet conduit 72 extends through one of the wall members 54 and may be joined to any suitable sample source and, for example, may be joined to a gas chromatograph or the like. Any suitable sample, may be introduced into the ion source box 62 through the sample inlet conduit 72.

Shown below the ion source box 62 is an electrically energized filament 76 which emits electrons. Shown immediately above the filament 76 is a bias plate 78, which is provided with an opening 80 therethrough, which is in alignment with the opening 64 in the lower wall 63 of the ion source box 62. An electron beam is emitted from the filament 76, and the beam is directed through the openings 80 and 64 and into the ion source box 62. The magnitude of the energy of the electron beam entering the ion source box 62 is basically controlled by controlling the voltage between the filament 76 and the lower wall 63 of the ion source box 62. The bias plate 78 served to focus the electron beam and to allow or block the entrance of the electron beam into the ion source box 62.

Means are provided for analysis of both positive and negative ions which are produced within the ion source box 62. A potential which is negative with respect to the walls 63, 67, and 70 is applied to the positive ion exit wall 65. Thus, positive ions formed within the ion source box 62 are attracted to the positive ion exit wall 65 and travel through the positive ion exit opening 66. A potential which is positive with respect to the walls 63, 65, and 70 is applied to the negative ion exit wall 67. Therefore, negative ions formed within the ion source box 62 are attracted to the negative ion exit wall 67 and travel through the negative ion exit opening 68.

The positive ions which travel through the positive ion exit opening 66, also travel through a positive ion focusing assembly 82. Then the positive ions travel through the opening 36 in the positive ion entrance plate 34 and into the positive ion analyzer section 26, within which is a resolution device 84, which may, for example, comprise a quadrupole analyzer or the like, which resolves the positive ions as they arrive in the resolution device 84. Resolution of the ions is made in accordance with the mass to charge ratio of the ions. The positive ions then travel to a positive ion detector plate 87, from which they are analyzed in any suitable manner, such as by means of a trace recorder or the like, which produces a spectra chart.

In a similar manner, the negative ions which exit from the ion source box 62 through the negative ion exit opening 68, also travel through a negative ion focusing assembly 90. Then the negative ions travel through the opening 40 in the entrance plate 38 and into the negative ion analyzer section 28, within which is a resolution device 94, similar to the resolution device 84 in the positive ion analyzer section 26. Then the negative ions travel to a negative ion detector plate 96 and are analyzed in a manner such as that described with respect to the positive ion detector plate 87.

If desired, the operation of the resolution devices 84 and 94 may be independent of each other and at different scanning rates. However, as discussed above, it is preferable to use quadrupole analyzers as the resolution devices such as the resolution devices 84 and 94 of FIG. 1. The required D.C. and R.F. energies of these two analyzers are derived from the same circuit which greatly facilitates the accurate mass calibration by comparing the obtained positive and negative ion mass spectra.

As illustrated in FIG. 1, post members 100 support stationary valve plate members 137 and 138. Resilient members 141 urge the valve plate members 137 and 138 one toward the other. Between the stationary valve plate members 137 and 138 is a rotary valve plate member 139 which is supported by a rotary shaft 144. The members 141 are so chosen that the force exerted on the valve plates 137 and 138 is adequate for ensuring sealing action between the upper surface of the valve plate 139 and the lower surface of the valve plate 137, as well as between the lower surface of the valve plate 139 and the upper surface of the valve plate 138. The exerted force applied between the engaging valve plates 137, 138, and 139 permits rotation of the rotary valve plate 139 while maintaining good sealing action between the engaging valve plates 137, 138, and 139. The surface of the rotary valve plate 139 can be made of any suitable material, such as teflon or the like, to provide anti-friction and sealing characteristics. The rotary shaft 144 extends through one of the wall members 54, and seal members 146 encompass the shaft 144 at the wall member 54. The shaft 144 is joined to a motor unit 150 for rotation thereby.

As illustrated in FIG. 1, the shaft 144 has attached thereto for rotation thereby the electrically non-conductive commutator 152, the surface of which is provided with electrically conductive contact portions 154 and 155. Stationary contact members 161, 162 and 163 are in engagement with the commutator 152 and are engageable with the contact portions 154 and 155 during rotation of the commutator 152. The stationary contact members 161, 162 and 163 are electrically joined to conductor members 166, 168 and 170, respectively. The conductor member 166 is electrically joined by means not shown, to a −250 volt D.C. source of electrical energy, now shown. The conductor member 170 is electrically joined by means, not shown, to a −70 volt D.C. source of electrical energy, again not shown. The conductor member 168 is electrically joined by means, not shown to the filament 76.

FIGS. 2, 3, and 4 show in detail the valve plates 137, 138 and 139. Reagent gas conduit members 235 and 236 extend through the wall member 54 and are joined to the stationary valve plate member 137 and are in communication with openings 248 and 249, respectively, in the stationary valve plate 137. The stationary valve plate 137 also has an aperture 254 and a slot 257 therethrough. The shaft 144 extends through an opening 258 in the stationary valve plate 137.

The openings 248 and 249 are preferably of diameters in the order of 0.5 mm. or less. These narrow gas passages serve as flow restrictors which control the flow rate of the reagent gases through these passages with the upstream pressures of the reagent gases maintained at regulated pressures substantially higher than the typical ion source pressure during a chemical ionization mode.

The rotary valve plate 139 has spaced-apart slots 260 and 262 therethrough. The slot 260 has a spacing from the shaft 144 equal to the spacing of the opening 248 from the shaft 144. The slot 262 has a spacing from the shaft 144 equal to the spacing of the opening 249 from the shaft 144. The rotary valve plate 139 also has slots 268 and 270 therethrough which are equally spaced from the shaft 144 equal to the spacing of the aperture 254 from the shaft 144.

The stationary valve plate 138 has an elongate aperture 275 therein, leading to a passage 276 which is in communication with the conduit 74. The areas and positions of the aperture 275 and the aperture 257 in the valve plate 137 are such that these apertures communicate with the slots 260, 262, 268 and 270 during rotation of the valve plate 139. The stationary valve plate 138 also has an opening 278 at the center thereof within which the end of the shaft 144 is located.

The valve plate members 137, 138, and 139, along with the associated parts such as the motor 150, the shaft 144, as well as the conduit members 235, 236, and 74, can be generally referred to as an automatic operation controlling device. This controlling device provides automatic operation of a chemical ionization mode and a venting mode without manual intervention. During a chemical ionization operation mode a preselected reagent gas flows into the ion source box 62 through the automatic operation controlling device. Each chemical ionization operation mode is followed by a venting operation mode during which the gaseous content of the ion source box 62 is rapidly vented out through the controlling device and into the ion source section 22 and pumped away subsequently.

The operation may be started with the rotary valve plate 139 rotated to a position shown in FIG. 3. This position corresponds to a first chemical ionization operation mode during which a first reagent gas goes through the opening 249 in the stationary plate 137, through the slot 262 in the rotary plate 139, through the aperture 275 in the stationary plate 138, through the conduit 74 to the ion source box 62. As stated above, the flow rate of the first reagent gas is largely controlled by the opening 249, with the upstream pressure maintained by a regulating valve. This reagent gas, along with the sample material introduced from the conduit 72, and the electron beam entering through the opening 64 in the lower wall 63, properly constitutes a condition favoring a chemical ionization operation within the ion source box 62. The positive and negative ions formed within this ion source box 62 are then extracted and analyzed.

It is noted that the slot 262 in the rotary plate 139 occupies approximately one quadrant of a circle. The chemical ionization mode will still remain in effect with further rotation of the rotary plate 139 until the slot 262 in the rotary plate 139 moves out of communication with the opening 249 in the stationary plate 137. During this chemical ionization mode the slots 268 and 270 in the rotary plate 139 are idle and sealed by the stationary plates 137 and 138. The slot 260 in the rotary plate 139 is also idle, but since the slot 260 is in communication with the slot 257 in the stationary plate 137 the gaseous content within the slot 260 remaining from the previous cycle of operation will be vented out through the slot 257 in the stationary plate 137.

As the slot 262 in the rotary plate 139 completely moves away from the opening 249 in the stationary plate 137 with further rotation of the rotary plate 139 a first venting operation mode begins. During this mode the gaseous content of the ion source box 62 flows outwardly through the conduit 74, through the aperture 275, through the slot 268, through the aperture 254, and then into the ion source section 22, and is pumped away. With this newly created pumping route the residue content of the ion source box 62 is rapidly vented out within one second or less.

During the venting operation mode the slots 260 and 262 in the rotary plate 139 are closed by the stationary plates 137 and 138, and the flow of reagent gases is automatically closed off. The residue gas remaining within the slot 270 in the rotary plate 139 is also vented out through the slot 257 in the stationary plate 137 during this period.

It is noted that as seen in FIG. 3 there is a small radial gap between the slots 262 and 268 in the rotary plate 139. One obvious purpose for this gap is to avoid simultaneous communication of these two slots with the aperture 275 in the stationary plate 138, which would cause premature leak of the first reagent gas through the opening 249, through the slot 262, through the aperture 275, through the slot 268, through the aperture 254, and into the ion source section 22. One other reason for this gap is that, if desired, the gap provides means for a time delay during which the flow of the first reagent gas into the ion source box 62 is closed off, but the venting operation mode still has not been initiated. This allows a portion of residue gas within the ion source box 62 to be vented out through the existing small openings 64, 66 and 68 in the ion source box 62 prior to the beginning of the venting operation mode. This ensures a smoother transition from the chemical ionization mode to the venting operation mode.

With further rotation of the rotary plate 139 the first venting mode will be succeeded by a second chemical ionization mode during which a second reagent gas flows through the conduit 235, through the opening 248, through the slot 260, through the aperture 275, through the conduit 74 to the ion source box 62. The slots 268 and 270 in the rotary plate 139 again become idle while, in the meantime, the residue content of the slot 262 is vented out through the slot 257 in the stationary plate 137.

Finally when the slot 270 in the rotary plate 139 is in communication with the aperture 254 of the plate 137 and with the aperture 275 of the plate 138, a second venting operation mode comes into effect. This mode is similar to the first venting operation mode, except that the residue content of the ion source box 62 is vented out through the slot 270, while the residue content of the slot 268 is vented out through the slot 257. A complete operation cycle is thus completed at the end of this venting mode.

If desired an electron impact ionization operation can also be performed within each operation cycle. For example, an electron impact ionization operation can be conducted during a portion of the venting operation mode, provided that the sample material and the electron beam are still present within the ion source box 62 during this time. It is desirable that an electron impact ionization mode is initiated after most of the residue reagent gas has been vented out of the ion source box 62.

It is often desirable that certain elements of the mass spectrometer be set at a given value for optimum operation of the chemical ionization mode and at a different value for optimum operation of the electron impact ionization mode. For example the optimum electron beam energy is normally at 70 electron volts for electron impact ionization, while a much higher value, 250 electron volts, is preferred for the chemical ionization. In the present design if the lower wall 63 of the ion source box 62 is at ground potential the variation of electron beam energy can be readily achieved by alternating the floating voltage of the filament 76. This floating voltage alternation of the filament 76 can also be achieved automatically. As the shaft 144 rotates to a position corresponding to a chemical ionization mode, the floating voltage applied to the filament 76 is automatically set at −250 volts as the contact members 161 and 162 engage the contact portion 154. Similarly as the shaft 144 rotates to a different position corresponding to an electron impact ionization mode the floating voltage applied to the filament 76 is automatically changed to −70 volts, as contact members 162 and 163 engage the contact portion 155.

The same principle can also be applied to the switching of the voltage settings of the positive ion focusing assembly 82 and negative ion focusing assembly 90 for optimum operation in the chemical ionization mode and in the electron impact ionization mode. Furthermore, a mass spectrometer of this invention may have a mass scanning circuit which can be operated with manual triggering. Thus, a triggering voltage pulse can be delivered to the mass scanning circuit at the beginning of each operation mode with proper arrangement of the commutator 152 in a manner similar to that described above. By allowing only one mass scanning for each operation mode the duration of each ionization mode can therefore be largely reduced.

It is clear from the description above that each operation cycle can basically consist of two chemical ionization modes employing two different chemical ionization reagent gases, with one venting operation mode following each chemical ionization mode. However, the source of the same chemical ionization reagent gas may be in communication with both conduit members 235 and 236. In such event, the operation cycle consists of only one chemical ionization mode and one venting operation mode. Obviously the sequence of operation during a cycle, as well as the duration of each operation mode, can be varied by changing the slot pattern, as well as the length of each slot in the rotary valve plate 139. The frequency of the cyclic operation may also be varied by varying the rotational rate of the motor 150.

Figure 5:
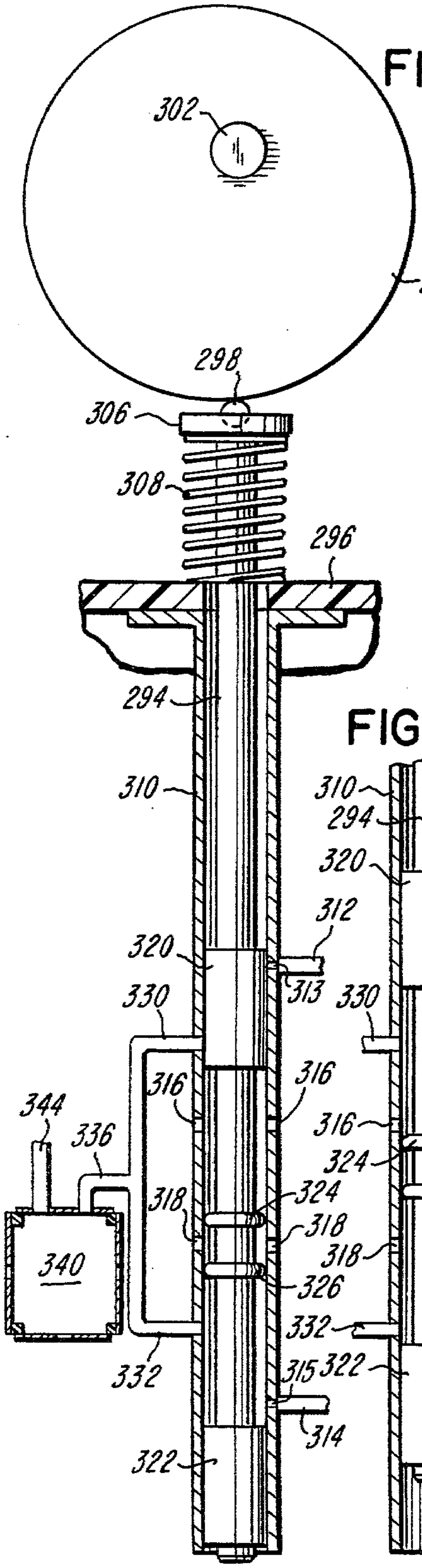
FIG. 5 is a diagrammatic view, with portions in section, illustrating another mass spectrometer of this invention.
Figure 6:
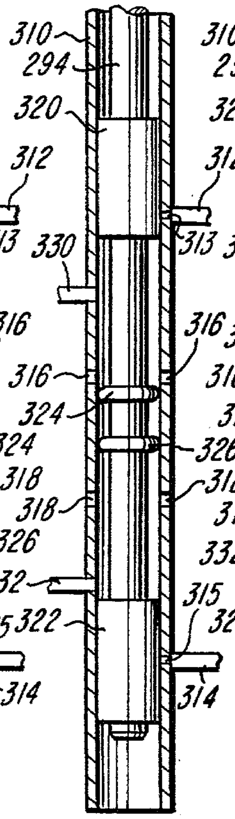
FIG. 6 is a fragmentary diagrammatic view, with portions in section, showing the mass spectrometer of FIG. 5 in another position of operation.
Figure 7:
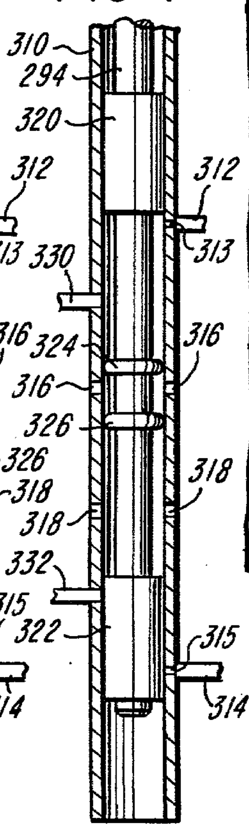
FIG. 7 is a fragmentary diagrammatic view, similar to FIG. 6, showing the mass spectrometer in another position of operation.

FIGS. 5, 6, and 7 illustrate another mass spectrometer of this invention in which an elongate piston rod 294 is axially movable within an enclosure 296. The piston rod 294 has an engagement member 298 at the upper end thereof, which is engaged by a rotary cam member 300, which rotates with rotation of a rotary support shaft 302. The piston rod 294 also has a collar 306 at the upper end thereof, which is engaged by a spring 308. The spring 308 is positioned between the collar 306 and the enclosure 296 and urges the piston rod 294 upwardly. The piston rod 294 is movable within a tube 310. The tube 310 has spaced-apart inlet ports 312 and 314. The inlet ports 312 and 314 are joined with the tube 310 through narrow passages 313 and 315, respectively. These narrow passages 313 and 315 serve to control the flow rates of the reagent gases into the tube 310 from the inlet ports 312 and 314, respectively. Between the inlet port 312 and the inlet port 314 is a plurality of pumping ports 316 and a plurality of pumping ports 318.

The piston rod 294 has attached thereto, within the tube 310, spaced-apart pistons 320 and 322, which are in sliding sealing engagement with the internal walls of the tube 310. The piston rod 294 carries spaced-apart sealing rings 324 and 326 between the pistons 320 and 322.

A conduit 330 and a conduit 332 are joined to the tube 310 in spaced-apart relationship and are in communication with the internal portion of the tube 310. The conduits 330 and 332 are joined by a conduit 336 to an ion source box 340, which may be of any suitable type and may, for example, be similar to the ion source box 62 of FIG. 1, and may function in a manner similar to that described with respect to the ion source box 62. The ion source box 340 may be within and part of an ion analysis structure similar to that discussed above with respect to the structure of FIG. 1. A sample for analysis may be introduced into the ion source box 340 in any suitable manner, such as, for example, through a conduit 344 which leads to the ion source box 340.

The inlet port 312 is adapted to be joined to a source of reagent gas, and the inlet port 314 is adapted to be joined to a source of another reagent gas. The piston rod 294 moves linearly reciprocally with rotation of the cam member 300. When the piston rod 294 is positioned as shown in FIG. 5, a reagent gas enters the tube 310 through the inlet port 314 and flows to the ion source box 340 through the conduits 332 and 336 for reaction with a sample within the ion source box 340. After reaction occurs, the piston rod 294 moves to the position thereof illustrated in FIG. 6, and a venting operation occurs. Gases within the ion source box 340 move outwardly therefrom through the conduits 336, 330 and 332, and into the tube 310, and outwardly from the tube 310 through the ports 316 and 318 as a vacuum exists within the enclosure 296. Then as the piston rod 294 continues to move upwardly to the position thereof shown in FIG. 7, another reagent gas flows into the tube 310 through the port 312 and into the ion source box 340 through the conduits 330 and 336. Then after reaction occurs in the ion source box 340, the piston rod 294 moves downwardly to the position thereof shown in FIG. 6, and another venting operation occurs through the pumping ports 316 and 318.

Thus, as the cam member 300 rotates and as the piston rod 294 moves linearly reciprocally, a plurality of reagent gases are individually and separately introduced into the ion source box 340, interspaced by venting operations. The cycle of reactions and venting operations is performed automatically and repeatedly and at a rate which is readily controlled.

An optional electron impact ionization operation can also be performed during the ion source venting mode, i.e., when the piston rod 294 moves to the position as shown in FIG. 6. During this period sample material is introduced into the ion source box 340 and ionized therein while the flow of reagent gas into the ion source box 340 is blocked.

Figure 8:
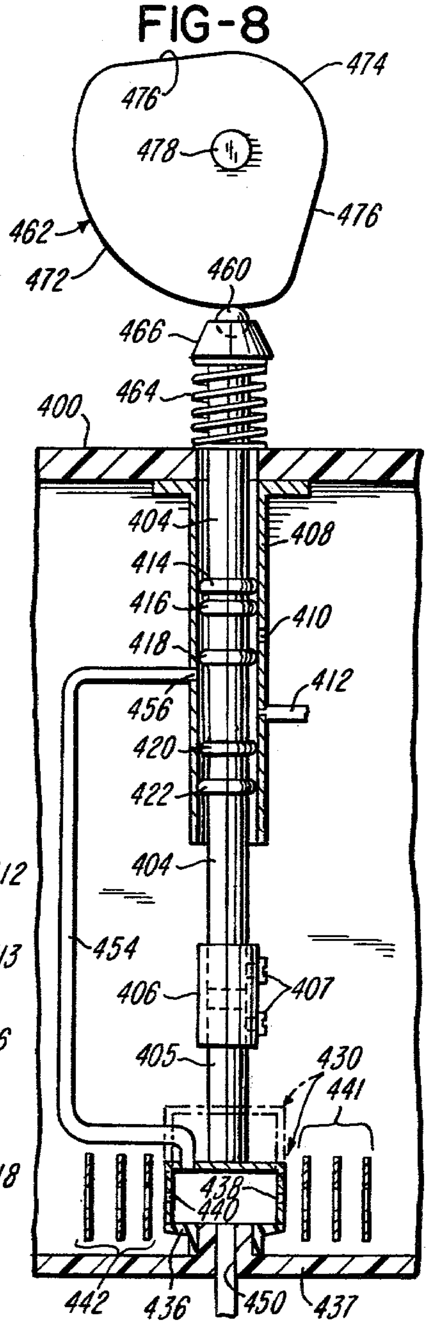
FIG. 8 is a diagrammatic view illustrating another mass spectrometer of this invention.

FIG. 8 illustrates another embodiment of a mass spectrometer of this invention. A housing 400 encloses a portion of a shaft 404 which slidably extends into the housing 400. A part of the shaft 404 within the housing 400 is enclosed by a tube 408, which is provided with an exhaust port 410 and an inlet port 412. Spaced-apart seal members 414, 416, 418, 420, and 422 tightly encompass the shaft 404 for movement therewith and slidably engage the inner surface of the tube 408.

Attached to the lower end of the shaft 404 by means of an adjustment sleeve 406 and clamping screws 407 is a stem 405 to which is attached an ion source box 430. The ion source box 430 is shown in engagement with a resilient seal member 436, which is supported by a support member 437. The ion source box 430 is open at the bottom thereof and has a positive ion exit opening 438 at one end thereof and a negative ion exit opening 440 at the other end thereof. In alignment with the positive ion exit opening 438 is a positive ion lens device 441. In alignment with the negative ion exit opening 440 is a negative ion lens device 442. The support member 437 has a passage 450 therethrough, leading to the ion source box 430. A flexible conduit 454 extends from the ion source box 430 to an opening 456 in the tube 408.

The upper end of the shaft 404 is exterior of the housing 400 and has a roller 460 in engagement with a rotatably mounted cam 462, which is joined to any suitable motor means, not shown, for rotation thereby.

The circumference of the cam 462 consists of one large curve portion 472, one small curve portion 474, and two largely linear portions 476, inter-connecting above two curve portions 472 and 474. Any point within the large curve portion 472 is at a constant distance from the cam rotation center 478, while any point within the small curve portion 474 is also at a constant but shorter distance away from the cam rotation center 478. The circumference of the cam 462 is shown engaged by the roller 460 during rotation of the cam 462.

A filament, not shown, which may be similar to the filament 76 shown in the instrument of FIG. 1, is employed to discharge electrons into the ion source box 430 through an opening, not shown. Sample material to be analyzed enters the ion source box 430 through the passage 450. A reagent gas enters the tube 408 through the inlet port 412 and flows to the ion source box 430 through the conduit 454. Positive ions move outwardly from the ion source box 430 through the positive ion lens 441 and then move through a resolution device, not shown, which may be similar to the resolution device 84 shown in FIG. 1. The positive ions then move to a positive ion detector plate, not shown, which may be similar to the detector plate 87 shown in FIG. 1. The negative ions flow from the ion source box 430 through the opening 440, then move through the negative ion lens 442 and through a resolution device, not shown, which may be similar to the resolution device 94 shown in FIG. 1. The negative ions then move to a detector plate, not shown, which may be similar to the negative ion detector plate 96 shown in FIG. 1. Thus, chemical ionization operation occurs. It is noted that during the entire period when the larger curve portion 472 is engaged with the roller 460 with the rotation of the cam 462 the shaft 404 as well as the ion source box 430 are motionless. This allows the ion exit openings 438 and 440 to remain aligned with the ion lens devices 441 and 442 for the operation of chemical ionization.

The shaft 404 is then raised slightly with rotation of the cam 462 so that the seal member 420 is positioned above the inlet port 412. Thus, the reagent gas is prevented from entering the conduit 454. At this position of the shaft 404, the seal member 418 is positioned above the exhaust port 410. A vacuum existing within the housing 400 exhausts the ion source box 430 through the conduit 454 and the exhaust port 410.

Also when the shaft 404 rises, the ion source box 430 is moved upwardly and vacuum conditions within the housing 400 provide direct exhaust to the region between the lenses 441 and 442. Furthermore, the volume enclosed by the ion source box 430 is also exhausted directly, due to the fact that the ion source box 430 is open at the lower end thereof.

It is therefore clear from above description that each complete revolution of the cam 462 corresponds to one operation cycle consisting of one chemical ionization mode and one ion source venting operation mode. The duration of the operation cycle can be readily varied by adjustment of the rate of rotation of the cam 462.

Provisions are also made such that electron impact ionization can also be performed during the ion source venting mode. As the small curve portion 474 of the cam 462 is engaged with the roller 460 the ion source box 430 will move away from the ionization region and to the position as illustrated by broken lines in FIG. 8.

Thus, it is understood that each instrument of this invention is capable of performing a predetermined operation cycle repetitively and automatically. Each operation cycle consists of one or more chemical ionization modes and ion source venting modes. One or more electron impact ionization modes can also be performed during each operation cycle should it be desired.

Figure 9:
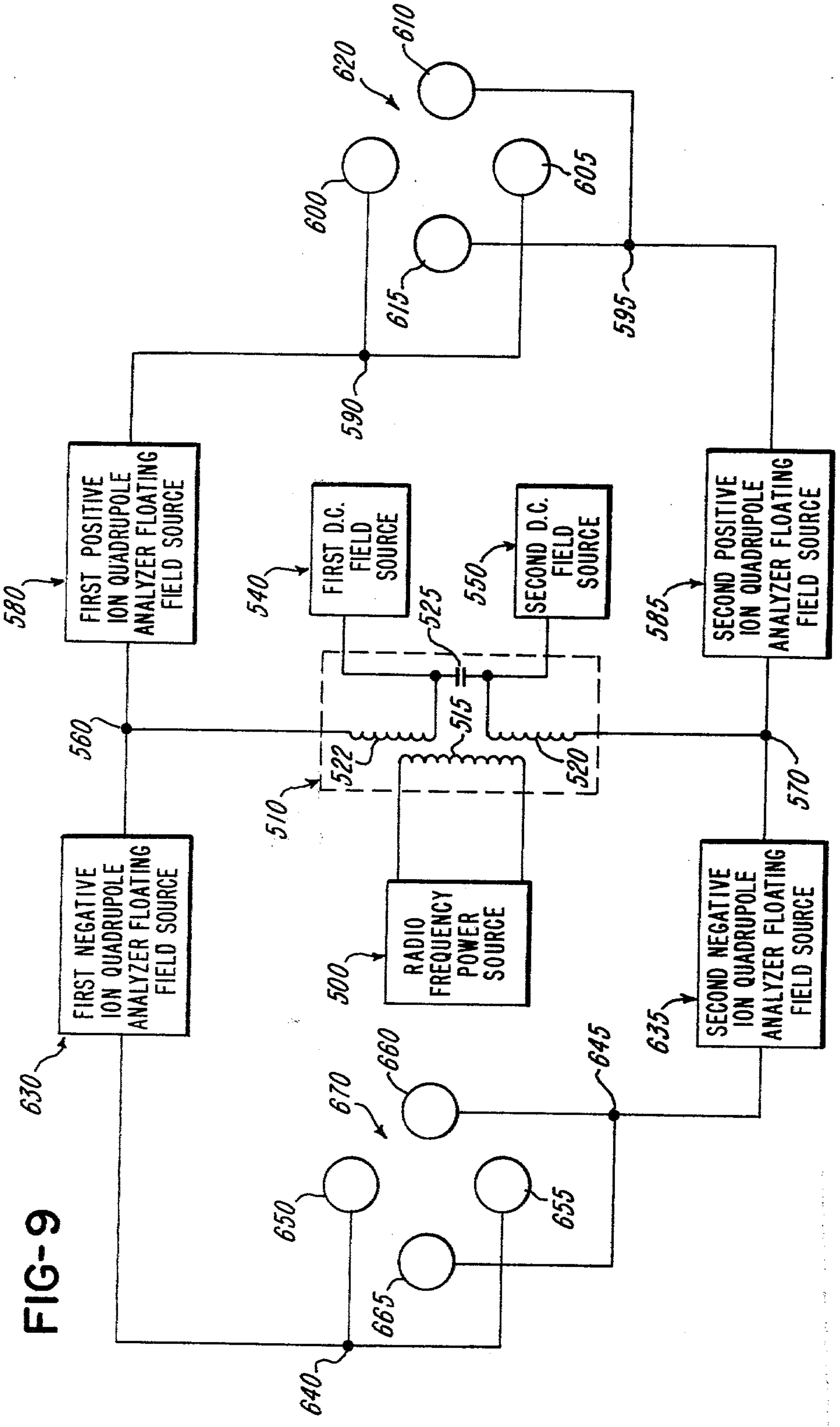
FIG. 9 is a schematic electric diagram of the quadrupole mass spectrometer of this invention.

FIG. 9 illustrates another aspect of this invention in which a technical advantage is achieved in a mass spectrometer such as that shown in FIG. 1 in which two quadrupole analyzers are utilized to analyze both positive and negative ions extracted simultaneously from the ionization region. This enables the same R.F. and D.C. fields (in reference to the applied floating fields) as well as the associated mass scanning circuit to be applied to these two quadrupole analyzers simultaneously. The basic principle of FIG. 9 can be expressed mathematically as follows:

| | |
|---|---|
| $\phi_1(t)$ | $= -W+U+V\cos(2\pi ft)$ |
| $\phi_{1'}(t)$ | $= -W-U-V\cos(2\pi ft)$ |
| $\phi_2(t)$ | $= +W+U+V\cos(2\pi ft)$ |
| $\phi_{2'}(t)$ | $= +W-U-V\cos(2\pi ft)$ |

The terms used in these equations are defined as follows:

| | |
|---|---|
| $t$ | = time |
| $\phi_1(t)$ | = potential field applied to the first quadrupole pair of the positive ion quadrupole analyzer; |
| $\phi_{1'}(t)$ | = potential field applied to the second quadrupole pair of the positive ion quadrupole analyzer; |
| $\phi_2(t)$ | = potential field applied to the first quadrupole pair of the negative ion quadrupole analyzer; |
| $\phi_{2'}(t)$ | = potential field applied to the second quadrupole pair of the negative ion quadrupole analyzer; |
| $U$ | = D.C. field component |
| $V\cos(2\pi ft)$ | = R.F. field component |
| $W$ | = floating field |
| $f$ | = frequency of the R.F. field components |

FIG. 9 illustrates circuitry in which a radio frequency power source 500 is connected to a transformer 510 for provision of required R.F. fields ($\pm V\cos 2\pi ft$). The transformer 510 includes a primary winding 515, a secondary winding 520, and a secondary winding 522. A capacitor 525 joins the secondary winding 520 to the secondary winding 522. A D.C. field source 540 which provides a positive field ($+U$) is electrically connected to one side of the capacitor 525. Similarly, a second D.C. field source 550, which provides a negative field ($-U$), is electrically connected to the other side of the capacitor 525.

A first positive ion quadrupole analyzer floating field source 580 and a second positive ion quadrupole analyzer floating field source 585, each of which supply a negative floating field ($-W$), allow the fields at points 590 and 595 to be maintained at ($-W+U+V\cos 2\pi ft$) and ($-W-U-V\cos 2\pi ft$), respectively. These fields are then applied to a first pole pair (poles 600 and 605) and a second pole pair (poles 610 and 615) of a positive ion quadrupole analyzer 620, respectively. Similarly, a first negative ion quadrupole analyzer floating field source 630 and a second negative ion quadrupole analyzer floating field source 635, each of which supplies a positive floating field ($+W$), allow the fields at points 640 and 645 to be maintained at ($+W+U+V\cos 2\pi ft$) and ($+W-U-V\cos 2\pi ft$), respectively. These fields are then applied to a first pole pair (poles 650 and 655) and a second pole pair (poles 660 and 665), respectively, of a negative ion quadrupole analyzer 670. The required potential fields applied to the positive ion quadrupole analyzer 620 and the negative ion quadrupole analyzer 670 as expressed in the previous equations are thus provided.

Regardless of the polarities of the ions, the assignment of the masses of the ions is largely determined by the applied D.C. and R.F. fields of the quadrupole analyzers. Since these fields applied to these analyzers are derived from the same circuit, as shown in FIG. 9, a positive ion and a negative ion of equal mass-to-charge ratio appear at the same value of the applied D.C. and R.F. fields. This greatly facilitates the task of mass calibration. The exact mass of an unknown ion is easily determined by the information obtained from the spectrum containing ions of opposite polarity and of known ion mass.

Detectors, such as the detectors, 87 and 96, shown in FIG. 1, may be employed to receive the ions leaving the quadrupole analyzers 620 and 670.

Although the preferred embodiments of the mass spectrometer of this invention has been described, it will be understood that within the purview of this invention various changes may be made in the form, details, proportion and arrangement of parts, the combination thereof, and the mode of operation, which generally stated consist in a mass spectrometer within the scope of the appended claims.

The invention having thus been described, the following is claimed:

1. In a mass spectrometer provided with a vacuum housing and an ionization region within the vacuum housing, comprising:

chemical ionization means for formation of ions within the ionization region through chemical ionization, venting means for alternately opening and closing gaseous communication between the ionization region and the vacuum housing, through the venting means, and operation means for operation of the chemical ionization means and the venting means within an operation cycle, said operation means including means for performing the operation cycle repetitively at a preselected frequency.

2. The mass spectrometer of claim 1 in which the operation means includes rotative means.

3. The mass spectrometer of claim 1 in which the operation means includes rotative means which controls the frequency of repetitive operation of the operation cycle.

4. The mass spectrometer of claim 1 in which the operation means includes reciprocally linearly movable means.

5. In the mass spectrometer of claim 1 in which the venting means includes pumping valve means for substantially opening and closing gaseous communication between the ionization region and the vacuum housing through the pumping valve means.

6. In the mass spectrometer of claim 1 in which the chemical ionization means includes gas introduction valve means having an aperture with a cross-sectional area less than 0.196 square millimeters for introducing a chemical ionization reagent gas from a source thereof into the ionization region through the aperture, during chemical ionization operation.

7. In the mass spectrometer of claim 1 in which the first chemical ionization means includes means for formation of both positive and negative ions within the ionization region during each operation cycle, the mass spectrometer also including extraction means for extracting both positive and negative ions from the ionization region during each operation cycle, the mass spectrometer also including detection means for detecting the positive and negative ions extracted from the ionization region.

8. In the mass spectrometer of claim 1 in which the operation means includes motor means.

9. In the mass spectrometer of claim 1 which includes enclosure means for at least partially enclosing the ionization region, the operation means including means for changing the position of the enclosure means.

10. In the mass spectrometer of claim 1 which includes enclosure means for at least partially enclosing the ionization region, the operation means including rotative means for changing the position of the enclosure means.

11. In a mass spectrometer provided with a vacuum housing and an ionization region within the vacuum housing comprising:

chemical ionization means for formation of ions within the ionization region through chemical ionization, venting means for alternately opening and closing gaseous communication between the ionization region and the vacuum housing, through the venting means, electron impact ionization means for operating the mass spectrometer in an electron impact ionization mode, and operation means for operation of the chemical ionization means, the venting means and the electron impact ionization means within an operative cycle, said operation means including means for performing the operation cycle repetitively at a preselected frequency.

12. The mass spectrometer of claim 11 in which the electron impact ionization means includes means for generating ions within the ionization region through electron impact ionization.

13. In a mass spectrometer operable in chemical ionization operation and having a vacuum housing and an ionization region within the vacuum housing comprising:

conduit means for gaseous communication with the ionization region, introduction valve means which includes first introduction valve means having an open position for introducing a first chemical ionization reagent gas from a source thereof into the ionization region through the first introduction valve means and the conduit means during chemical ionization operation, the first introduction valve means having a closed position for substantially closing gaseous communication between the source of the first chemical ionization reagent gas and the ionization region through the first introduction valve means, exhaust valve means having an open position providing for passage of the gaseous content of the conduit means into the vacuum housing through the exhaust valve means, the exhaust valve means having a closed position for substantially closing gaseous communication through said exhaust valve means between the conduit means and the vacuum housing, operation means for performing a cyclic operation repetitively at a predetermined frequency, said cyclic operation including a first phase operation and a second phase operation, during the first phase operation, the operation means being operable for operating the first introduction valve means to the open position and for operating the exhaust valve means to the closed position, during the second phase operation, the operation means being operable for operating the first introduction valve means to the closed position and for operating the exhaust valve means to the open position.

14. In the mass spectrometer of claim 13 in which the operation means includes rotative means.

15. In the mass spectrometer of claim 13 in which the operation means includes reciprocally linearly movable means.

16. In the mass spectrometer of claim 14 in which the operation means includes motor means for driving the rotative motion of the rotative means.

17. In the mass spectrometer of claim 15 in which the operation means includes a rotative member for driving the reciprocal motion of the reciprocally linearly movable means.

18. In the mass spectrometer of claim 13 in which the introduction valve means also includes second introduction valve means having an open position for introducing a second chemical ionization reagent gas from a source thereof into the ionization region through the second introduction valve means, the second introduction valve means having a closed position for closing gaseous communication between the source of the second chemical ionization reagent gas and the ionization region, said cyclic operation also includes a third phase operation, during the third phase operation, the operation means being operable for operating the second introduction valve means to the open position and for operating the exhaust valve means to the closed position.

19. In the mass spectrometer of claim 13 in which at least a portion of the exhaust valve means is located within the vacuum housing.

20. In the mass spectrometer of claim 13 in which at least a portion of the introduction valve means is located within the vacuum housing.

21. The mass spectrometer of claim 13 in which the conduit means has at least a portion thereof consisting of flexible material.

22. In the mass spectrometer of claim 13 in which the first introduction valve means includes an aperture having a cross-sectional area less than 0.196 square millimeters for passage of the first chemical ionization reagent gas therethrough during chemical ionization operation, the first introduction valve means having the open position for introducing the first chemical ionization reagent gas into the ionization region through the aperture, the first introduction valve means having the closed position for substantially closing gaseous flow through said aperture.

23. A mass spectrometer operable in a chemical ionization mode comprising:

a vacuum housing, means forming an ionization region, valve means which includes stationary means and rotative means, first conduit means, the first conduit means providing gaseous communication between the valve means and the ionization region, a first chemical ionization reagent gas source, second conduit means, the second conduit means providing gaseous communication between the first chemical ionizaton reagent gas source and the valve means, and continuously rotating motor means for driving the rotative motion of the rotative means for alternately permitting and preventing gaseous flow between the first conduit means and the second conduit means.

24. The mass spectrometer of claim 23 in which the valve means is provided with an aperturre having an area less than 0.196 square millimeters for controlling the flow rate of the first chemical ionization reagent gas therethrough during chemical ionization operation.

25. The mass spectrometer of claim 23 in which the valve means includes gas passage means which has a cross-sectional formation which is arcuate for providing a continuous passage while rotative movement occurs throughout a portion of each revolution of the rotative means.

26. The mass spectrometer of claim 23 which also comprises:

a second chemical ionization reagent gas source, third conduit means, the third conduit means providing gaseous communication between the second chemical ionization reagent gas source and the valve means, the rotative means also being operable for alternately permitting and preventing gaseous flow between the first conduit means and the third conduit means.

27. The mass spectrometer of claim 23 in which the rotative means is also operable for alternately opening and closing gaseous communication between the first conduit means and the vacuum housing through the valve means.

28. A mass spectrometer operable in a chemical ionization mode comprising:

a vacuum housing, means forming an ionization region, valve means which includes stationary means and linearly reciprocally movable means, first conduit means, the first conduit means providing gaseous communication between the ionization region and the valve means, a first chemical ionization reagent gas source, second conduit means, the second conduit means providing gaseous communication between the first chemical ionization reagent gas source and the valve means, and continuously rotating rotative means for driving the linearly reciprocally movable means of the valve means for alternately opening and closing gaseous communication between the first conduit means and the second conduit means through the valve means.

29. The mass spectrometer of claim 28 in which the valve means includes an aperture having a cross-sectional area less than 0.196 square millimeters for passage of the first chemical ionization reagent gas therethrough during chemical ionization operation.

30. The mass spectrometer of claim 28 in which the valve means provides gaseous communication between the first conduit means and the vaccum housing and in which the linearly reciprocally movable means alternately opens and closes gaseous communication between the first conduit means andd the vacuum housing through the valve means.

31. The mass spectrometer of claim 28 in which the movable means includes shaft means, and the stationary means includes tube means enclosing a portion of the shaft means for forming elongate annular gas passage means therebetween.

32. The mass spectrometer of claim 28 in which the means forming the ionization region includes an ionization region enclosure member for at least partially enclosing the ionization region, the rotative means also being operable for linear reciprocal motion of the ionization region closure member.

33. The mass spectrometer of claim 28 which also comprises:

a second chemical ionization reagent gas source, third conduit means, the third conduit means providing gaseous communication between the second chemical ionization reagent gas source and the valve means, the movable means also being operable for alternately opening and closing the gaseous communication between the first conduit means and the third conduit means.

34. A method of chemical analysis using a mass spectrometer for chemical ionization and electron impact ionization, the mass spectrometer having sample introduction means, ion resolution means, ion detection means, a vacuum housing, an ionization region within the vacuum housing, and a substantially openable and closeable gas passage, comprising the operation of an operation cycle including the steps of:

1. introducing a first chemical ionization reagent gas into the ionization region, generating ions within the ionization region through chemical ionization, and extracting the ions from the ionization region for analysis,
2. opening the gas passage for transmitting gaseous materials from the ionization region into the vacuum housing through the gas passage,
3. generating ions within the ionization region through electron impact ionization, and extracting the ions from the ionization region for analysis,
4. closing the gas passage, and operating the operation cycle repetitively at a preselected frequency.

35. The chemical analysis method of claim 34 in which the operation cycle also includes the step of:

5. introducing a second chemical ionization reagent gas into the ionization region, generating ions within the ionization region through chemical ionization, and extracting the ions from the ionization region for analysis.

36. The chemical analysis method of claim 34 in which the step 1 also includes:

generating both positive ions and negative ions within the ionization region through chemical ionization, and extracting both the positive ions and the negative ions from the ionization region for analysis.

37. The method of chemical analysis of claim 36 in which the step 1 also includes:

extracting both the positive ions and the negative ions simultaneously from the ionization region for analysis.

38. A method of chemical analysis using a mass spectrometer having sample introduction means, ion resolution means, ion detection means, a vacuum housing, and an ionization region within the vacuum housing, and a substantially openable and closeable gas passage, comprising the operation of an operation cycle including the steps of:

1. introducing a first chemical ionization reagent gas into the ionization region, generating ions within the ionization region through chemical ionization, and extracting the ions from the ionization region for analysis,
2. opening the gas passage for transmitting gaseous materials from the ionization region into the vacuum housing through the gas passage,
3. closing the gas passage, and operating the operation cycle repetitively at a preselected frequency.

39. The chemical analysis method of claim 38 in which the operation cycle also includes the step of:

4. introducing a second chemical ionization reagent gas into the ionization region, generating ions within the ionization region through chemical ionization, and extracting the ions from the ionization region for analysis.

40. The chemical analysis method of claim 38 in which the step 1 also includes:

generating both positive ions and negative ions within the ionization region through chemical ionization, and extracting both the positive ions and the negative ions from the ionization region for analysis.

41. The chemical analysis method of claim 40 in which the step 1 also includes:

extracting both the positive ions and the negative ions simultaneously from the ionization region for analysis.

42. In a mass spectrometer operable in chemical ionization operation and provided with a vacuum housing, a source of chemical ionization reagent gas and an ionization region comprising:

a valve having an aperture with its cross-sectional area less than 0.196 square millimeters for serving as a flow restrictor to regulate gaseous flow rate through said aperture during chemical ionization operation, means joining the valve to the source of chemical ionization reagent gas and to the ionization region, said valve also having an open position for introducing the chemical ionization reagent gas from the source thereof into the ionization region through the aperture, said valve also having a closed position for substantially closing the flow of the chemical ionization reagent gas into the ionization region through the valve, operation means for operating the valve in the open position and operating the valve in the closed position sequentially within an operation cycle, and the operation means also including means for operating the operation cycle repetitively at a preselected frequency.

43. The mass spectrometer of claim 42 in which the valve is at least partially located within the vacuum housing.

44. The mass spectrometer of claim 42 in which the aperture is a circular aperture having a diameter less than 0.5 millimeters.

45. The mass spectrometer of claim 42 in which the operation means includes rotative means.

46. The mass spectrometer of claim 42 in which the operation means includes linearly reciprocally movable means.

47. A method of chemical analysis using a mass spectrometer having sample introduction means, ion resolution means, ion detection means, and an ionization region comprising the operation of an operation cycle including the steps of:

1. introducing a first chemical ionization reagent gas into the ionization region, generating positive ions and negative ions within the ionization region through chemical ionization, and extracting the positive ions and negative ions from the ionization region for analysis,
2. generating ions within the ionization region through electron impact ionization, and extracting the ions from the ionization region for analysis, and operating the operation cycle repetitively at a preselected frequency.

48. The chemical analysis method of claim 47 in which the operation cycle also includes the step of:

3. introducing a second chemical ionization reagent gas into the ionization region, generating positive ions and negative ions within the ionization region through chemical ionization, and extracting the positive ions and the negative ions from the ionization region for analysis.

49. The chemical analysis method of claim 47 in which the step 1 also includes:

extracting both the positive ions and the negative ions simultaneously from the ionization region for analysis.

50. The mass spectrometer of claim 29 in which the rotative means includes a cam member.

51. The mass spectrometer of claim 32 in which the ionization region enclosure member includes means forming an ion exit aperture.

* * * * *

UNITED STATES PATENT AND TRADEMARK OFFICE

CERTIFICATE OF CORRECTION

PATENT NO. : 4,266,127

DATED : May 5, 1981

INVENTOR(S) : Cherng Chang

It is certified that error appears in the above-identified patent and that said Letters Patent are hereby corrected as shown below:

On the cover page, Column 2, change line 8 to read as follows:

---Anal. Chem., vol. 48, No. 12, Oct. 1976, pp. 1829-1831.---

Column 6, line 59, change "goes" to ---flows---.

Column 11, line 57 should read as follows:

---$\phi 1'(t)$ = -W-U-V cos ($2\pi ft$)---;

line 59 should read as follows

---$\phi 2'(t)$ = +W-U-V cos ($2\pi ft$)---;

line 69 should read as follows:

---$\phi 1'(t)$ = potential field applied to the second---.

Column 12, line 7 should read as follows:

---$\phi 2'(t)$ = potential field applied to the second---.

UNITED STATES PATENT AND TRADEMARK OFFICE

CERTIFICATE OF CORRECTION

PATENT NO. : 4,266,127
DATED : May 5, 1981
INVENTOR(S) : Cherng Chang

It is certified that error appears in the above-identified patent and that said Letters Patent are hereby corrected as shown below:

Column 16, line 49, change "andd" to ---and---; line 61, change "closure" to ---enclosure---.

Column 18, correct lines 62 through 66 to read as follows:

2. generating ions within the ionization region through electron impact ionization, and extracting the ions from the ionization region for analysis, and operating the operation cycle repetitively at a pre-selected frequency.

Column 20, line 4, change "29" to ---28---.

Signed and Sealed this

*Twenty-ninth* Day of *September 1981*

[SEAL]

*Attest:*

GERALD J. MOSSINGHOFF

*Attesting Officer* *Commissioner of Patents and Trademarks*